Aug. 5, 1958   J H. HUNT   2,846,268
VEHICLE WHEELS

Filed April 19, 1954   2 Sheets-Sheet 1

*INVENTOR.*
J HAROLD HUNT
BY
Barnes, Kisselle, Laughlin & Raisch
ATTORNEYS

Aug. 5, 1958 J H. HUNT 2,846,268
VEHICLE WHEELS
Filed April 19, 1954 2 Sheets-Sheet 2

INVENTOR.
J HAROLD HUNT
BY
Barnes, Kisselle, Laughlin & Raisch
ATTORNEYS

United States Patent Office 2,846,268
Patented Aug. 5, 1958

2,846,268

VEHICLE WHEELS

J Harold Hunt, Lansing, Mich., assignor to Motor Wheel Corporation, Lansing, Mich., a corporation of Michigan Application April 19, 1954, Serial No. 424,195

5 Claims. (Cl. 301—12)

This invention relates to vehicle wheels and has more particularly to do with means for attaching a drop-center rim to cast spoke type truck wheels.

The most common type of truck wheel presently in use is in the form of a cast body portion having a plurality of spokes radiating outwardly from the center with a tire rim removably mounted on the ends of the spoke by means of clamps. The rim is usually of the flat base type having an integral tire flange at one edge and a gutter at its other edge in which a removable tire flange is adapted to be forced after the tire is mounted thereon. The gutter portion of the rim seats against a tapered seat formed on the spoke ends and the rim is held in place by clamps bolted to the front face of the spokes. Flat base rims however are not well suited for use with tubeless tires. A drop-center rim with its integral tire flanges is better suited for use with tubeless tires because it provides a better seal against air leakage.

The present invention has for its object the provision of a drop-center rim for a tubeless tire that can be removably mounted on the conventional cast spoke type wheel without requiring any change in the wheel itself.

Figure 1:
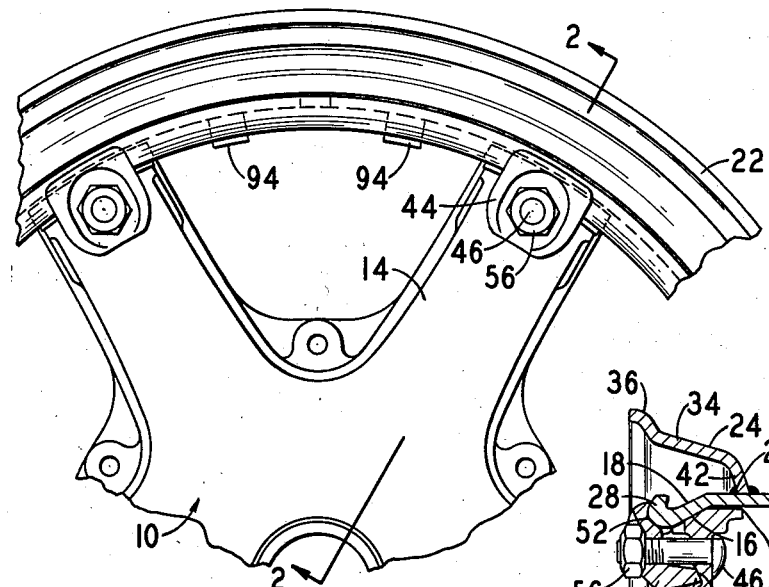
Fig. 1 is a fragmentary front elevational view of a conventional spoke type wheel on which is mounted one form of rim of the present invention.
Figure 2:
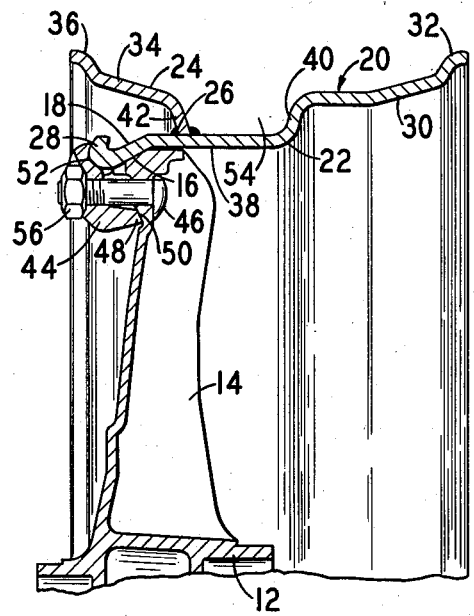
Fig. 2 is a sectional view along the line 2—2 of Fig. 1.

Referring first to Figs. 1 and 2, there is shown a wheel which includes a body portion 10 having a hub 12 at the center thereof and having spokes 14 cast integrally therewith and radiating from the hub 12. At their outer ends each spoke 14 is fashioned with a bearing face 16 which tapers radially inwardly towards the front face of the wheel. The tapered faces 16 provide seats against which an inclined flange portion 18 of the rim 20 is adapted to seat. Rim 20 is made with two rings 22 and 24 which are welded or otherwise secured together as at 26. The ring 22 terminates at one edge in the inclined flange portion 18, the free end of which is turned radially outwardly as at 28. The opposite edge of ring 22 is fashioned with a seat 30 for the bead of the tire and a radially outwardly extending tire flange 32. Ring 24 is also fashioned with a tire bead seat 34 and a radially outwardly bent tire flange 36. Ring 22 has a flat central portion 38 which is connected with the tire bead seat 30 by an outwardly bent portion 40 and ring 24 is bent inwardly as at 42 so that the portions 38, 40 and 42 provide a radially inwardly offset channel around the central portion of the rim.

For removably securing the rim 20 on the outer ends of spokes 14 there are provided clamping members 44 which are supported on threaded studs 46 extending axially outwardly adjacent the upper outer end of each spoke. Clamping members 44 are fashioned with a fulcrum portion 48 adapted to seat against the spoke as at 50 and with an arcuate groove 52 shaped to engage with the radially outwardly turned free edge 28 of the ring 22 of the rim.

Rings 22 and 24 cooperate to form what is generally referred to as a drop-center rim. One advantage of a rim of this type is that it is more adaptable for use with tubeless tires than is the case with rims having a removable tire flange as distinguished from rims having integral tire flanges. In the rim shown in Figs. 1 and 2 the inclined annular flange portion 18 with the outwardly turned free edge 28 has substantially the same shape as the gutter portion of a conventional flat base type rim in which the removable tire flange is mounted and by means of which the rim is clamped on the spoke ends. Thus the rim 20 is adapted to be mounted on a conventional truck wheel 10 primarily designed for accommodating a flat base rim. When the rim is positioned on the spokes as shown and the nut 56 is tightened, the clamp 44 bears against the outwardly turned edge 28 of the rim thus tending to shift the rim axially inwardly of the wheel and the rim is expanded radially outwardly by engagement of the inclined flange 18 with the tapered seats 16 on the spoke ends.

Figure 3:
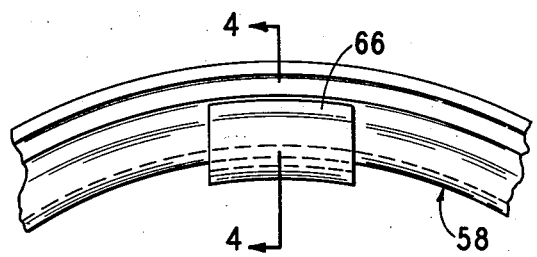
Fig. 3 is a fragmentary front elevational view of a second form of rim embodying the present invention.
Figure 4:
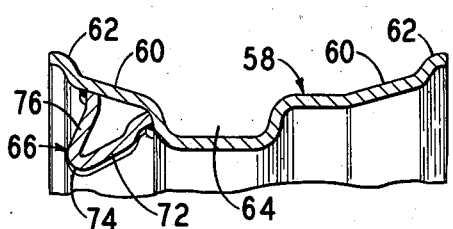
Fig. 4 is a sectional view taken along the line 4—4 of Fig. 3.

In Figs. 3 and 4 there is shown a second form of rim embodying the present invention. This rim, designated 58, is formed from a single ring and is fashioned with tire bead seats 60 and tire flanges 62 along its opposite edges and with a central channel 64 disposed radially inwardly of the tire bead seats 60. A plurality of lugs 66 circumferentially spaced to correspond with the spacing of the spokes 14 of the wheel are secured as by welding or riveting to the inner face of the rim around the portion thereof corresponding to one of the tapered tire bead seats 60. The lugs 66 are generally V-shaped in cross section. Each lug is fashioned with a radially inwardly inclined leg 72 which is bent as at 74 into a radially outwardly extending leg 76. The legs 72 and 76 of lugs 66 correspond in shape and position with the inclined flange 18 and outwardly turned end 28 of the rim 20, shown in Fig. 2. Thus the rim 58 is arranged to be mounted on a wheel, such as shown in Figs. 1 and 2, by aligning the lugs 66 with the ends of the spokes 14 and seating the legs 72 of the lugs on the inclined seats 16 of the spokes. Thereafter when the nuts 56 are tightened to bring the clamps 44 into engagement with the curved portion 74 and the outwardly turned legs 76 of lugs 66, the ring is radially expanded into firm engagement with the ends of the spokes.

Figure 5:
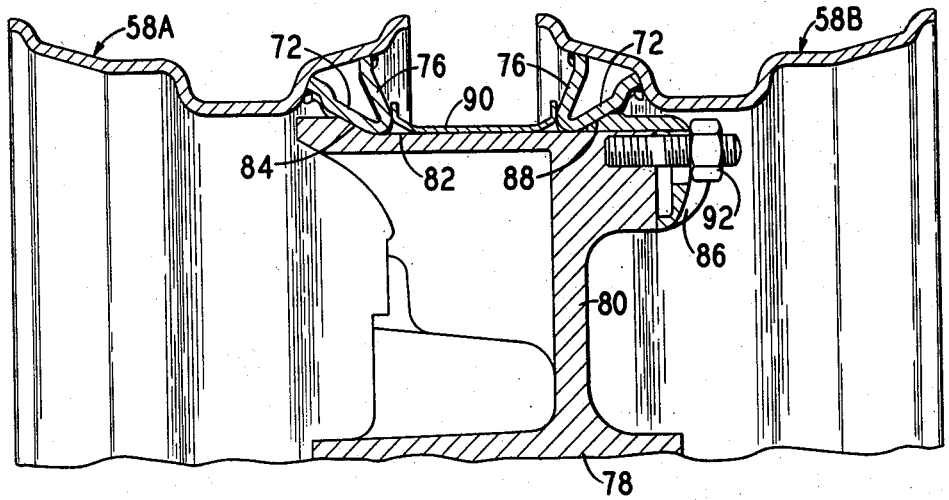
Fig. 5 is a fragmentary sectional view of a dual wheel assembly which includes two rims of the type shown in Figs. 3 and 4.

It will be appreciated that the rims shown in Figs. 1 through 4 are equally adapted for mounting on spoke wheels designed for mounting thereon dual rims of the flat base type. A wheel of this type is shown in Fig. 5 and includes a hub 78 from which spokes 80 radiate. Each spoke is fashioned at its outer end with a generally cylindrical portion 82 which terminates at the inner side of the wheel in an annular radially outwardly and axially inwardly inclined seat 84. The seat 84 is arranged to engage with the radially inwardly sloping leg 72 on the lug 66 of rim 58. The clamp 86 is fashioned with a tapered seat 88 which is shaped to engage with the sloping leg 72 on the other rim mounted on the wheel. Between the two rims there is mounted on the cylindrical portion 82 of the spokes an annular spacer 90. With this arrangement it will be observed that when the clamping nuts 92 are tightened, clamps 86 shifts both rims 58a and 58b and spacer 90 axially inwardly thereby causing the rim 58a to be radially expanded by the seats 84 and the rim 58b to be radially expanded by the seats 88 on the clamps 86.

Figure 6:
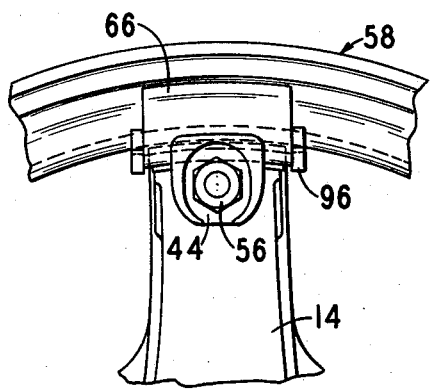
Fig. 6 is a fragmentary front elevational view of a wheel assembly including a rim of the type shown in Figs. 3 and 4 and provided with means for preventing relative rotation between the rim and the spoked portion of the wheel.
Figure 7:
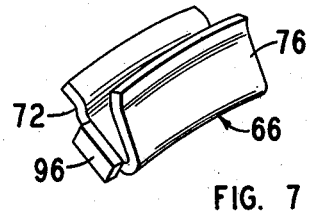
Fig. 7 is a perspective view of a mounting lug shown on the rim in Fig. 6.
Figure 8:
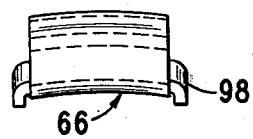
Figs. 8 and 9 are front elevational and perspective views, respectively, of a mounting lug of modified construction.
Figure 9:
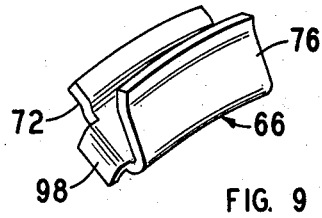

Most demountable rims are provided with means for preventing the rim from creeping around the spokes and for protecting the tire valve stem. In the arrangement shown in Fig. 1, two lugs 94 are welded to the flat central portion 38 of the rim between a pair of adjacent spokes to prevent such creeping and thereby insure a driving connection between the spokes and the rim. With the rims shown in Figs. 3 and 4, the base of the channel 64 is spaced from the end face of the wheel spokes and therefore other means are provided to insure against such creeping. One form of such means is shown in Fig. 6 wherein a depending lug 96 is welded to the opposite ends of lugs 66. If desired, these depending lugs may be formed integrally with lugs 66 and bent as shown at 98 in Figs. 8 and 9.

I claim:

1. A drop-center rim adapted to be removably mounted on a wheel having radially extending spokes provided with means at the outer ends thereof adapted to be brought into clamping engagement with a flange portion of a rim comprising, an annular member having a radially outwardly extending flange at one edge thereof and a radially inwardly extending flange at the opposite edge thereof, said last mentioned flange being shaped for engagement by said clamping means at the outer ends of said spokes, said member having a generally cylindrical portion adjacent said last mentioned flange, said generally cylindrical portion being integrally connected with said radially outwardly extending flange by a radially outwardly extending wall having an axial extension at its outer end which merges with said first mentioned flange and a second annular member having a generally radially outwardly extending flange at one edge and a generally radially inwardly extending flange at the opposite edge, the inner edge of said last mentioned annular member being welded to the outer face of said generally cylindrical portion of said first member with an air-tight connection along a circumferential line spaced axially inwardly from said radially outwardly extending wall to define the channel portion of a drop-center type rim, said radially inwardly extending flange of said first annular member having a radially outwardly, axially inwardly sloping bearing face on the radially inner face thereof.

2. The combination called for in claim 1 wherein said radially inwardly extending flange of said second member is secured to said generally cylindrical portion of said first member by a circumferentially continuous weld.

3. The combination called for in claim 1 wherein said radially inwardly extending flange of said first member is turned radially outwardly around its free edge to define a generally V-shaped annular bead around one edge of said first member.

4. A vehicle wheel assembly comprising a body portion having a plurality of radial spokes and a rim removably mounted on the outer ends of said spokes, said spokes each having a bearing face at the outer end thereof, said bearing faces sloping radially outwardly in a direction axially inwardly of the wheel, clamp members movably mounted at said ends of said spokes and provided with a bearing face at the axially inner side thereof, said bearing faces being axially spaced to define a generally U-shaped groove therebetween, said rim having annular tire bead seats around the edges thereof and an annular channel-shaped central portion disposed between said seats and radially inwardly thereof, said rim including integral lug means seated in the groove between said bearing faces, said lug means extending radially inwardly beyond said channel-shaped central portion, and means for urging said clamp members axially inwardly to bring said bearing faces into clamping engagement with said lug means of said rim, said bearing faces at the ends of said spokes and said lug means having radially outwardly and axially inwardly inclined portions which are interengaged such that the rim is radially expanded when said clamp members are urged axially inwardly, said interengaged inclined portions of said spokes and lugs forming the sole means resisting axial inward movement of said rim relative to said body portion, said lug means comprising a flange on said rim formed as an axial extension of the bottom wall of said channel-shaped central portion, one of said tire bead seats forming an annulus welded to said flange and providing one side wall of said channel-shaped central portion.

5. A drop-center rim adapted to be removably mounted on a wheel having radially extending spokes provided with means at the outer ends thereof adapted to be brought into clamping engagement with portions of the rim, said rim having a generally channel-shaped central portion and radially outwardly tapering tire bead seats extending away from opposite edges of said central channel portion, said tire bead seats being disposed radially outwardly of said central channel portion and terminating at opposite edges of the rim in radially outwardly extending tire flanges, said tire bead seats and said central portion forming an imperforate wall extending between said tire flanges whereby to form an air-tight closure for the tire mounted thereon and a plurality of radially inwardly projecting lug means welded to the tire bead seat on the radial inner side of the rim, said lug means being shaped to interengage with said clamping means at the outer ends of said spokes and having bearing face portions which slope radially outwardly in a direction axially inwardly of the rim, said lugs being provided with radially inwardly extending abutments at opposite radial edges thereof adapted to engage with the spokes to prevent relative rotation between the spokes and the rim.

References Cited in the file of this patent

UNITED STATES PATENTS

| | | |
|---|---|---|
| 2,149,113 | Buss | Feb. 28, 1939 |
| 2,194,206 | MacDonald | Mar. 19, 1940 |
| 2,290,623 | Sloneker | July 21, 1942 |
| 2,316,642 | Woodward | Apr. 13, 1943 |
| 2,521,260 | Sinclair | Sept. 5, 1950 |